United States Patent [19]

Arndt et al.

[11] 3,888,945

[45] June 10, 1975

[54] METHOD FOR PREPARING POLYMERS IN SOLID PARTICULATE FORM

[75] Inventors: Peter Joseph Arndt, Jugenheim; Horst Pennewiss, Hermann Plainer, Wilhelm Krall, all of Darmstadt; Juergen Masanek, Pfungstadt; Manfred Mueller, Rossdorf Uber Darmstadt, all of Germany

[73] Assignee: Rohm GmbH, Darmstadt, Germany

[22] Filed: July 10, 1972

[21] Appl. No.: 270,144

[30] Foreign Application Priority Data

July 22, 1971 Germany............................ 2136585

[52] U.S. Cl.... 260/876 R; 260/2.5 B; 260/29.2 PT; 260/34.2 R; 260/836; 260/876 B
[51] Int. Cl........................ C08g 15/00; C08g 19/00
[58] Field of Search ............ 260/715 B, 876, 876 R, 260/34.2, 29.6 PT, 29.6 PM

[56] References Cited
UNITED STATES PATENTS

| | | | |
|---|---|---|---|
| 3,236,800 | 2/1966 | Waterman | 260/29.6 PT |
| 3,317,635 | 5/1967 | Osmond | 260/881 |
| 3,382,297 | 5/1968 | Thompson | 260/875 |
| 3,405,087 | 10/1968 | Fryd | 260/876 R |
| 3,424,705 | 1/1969 | Heij | 260/29.6 PT |
| 3,446,769 | 6/1969 | Opipara | 260/31.2 R |
| 3,450,650 | 6/1969 | Murata | 260/2.5 M |
| 3,532,663 | 10/1970 | Nicks | 260/34.2 |
| 3,607,821 | 9/1971 | Clarke | 260/34.2 |
| 3,654,193 | 4/1972 | Seiner | 260/2.5 M |
| 3,655,591 | 4/1972 | Seiner | 260/2.5 M |
| 3,661,835 | 5/1972 | Baker | 260/34.2 |
| 3,673,142 | 6/1972 | Saunders | 260/29.6 PT |
| 3,691,123 | 9/1972 | Clarke | 260/29.1 R |
| 3,728,301 | 4/1973 | Spence | 260/33.6 R |
| 3,733,294 | 5/1973 | Keown | 260/33.6 A |
| 3,737,401 | 6/1973 | Tsou | 260/34.2 |
| 3,759,864 | 9/1973 | Nicks | 260/33.6 EP |
| 3,787,525 | 1/1974 | McGarr | 260/859 |

Primary Examiner—Paul Lieberman
Attorney, Agent, or Firm—Curtis, Morris & Safford

[57] ABSTRACT

Method of making a polymer in solid particulate form by finely distributing a solution of the polymer, in a volatile polar solvent therefor, in a non-polar organic liquid suspending medium substantially immiscible with said polar solvent and not a solvent for said polymer, and then removing the volatile solvent while inhibiting aggregation of the resultant polymer solids by the presence of a surface-active agent, preferably a block copolymer or graft copolymer having a polar and a non-polar portion.

10 Claims, No Drawings

METHOD FOR PREPARING POLYMERS IN SOLID PARTICULATE FORM

The present invention realtes to a method for preparing polymers in the form of solid particles.

Polymers which are used in dissolved form, for example as coating agents, binders, thickeners, and the like, are often sold commercially in the form of their solutions. Although polymer solutions offer the processor the advantage that they can be used directly or can be easily diluted to a desired concentration, the solutions, on the other hand, present serious difficulties in transport and storage. In addition to the desired polymer, a large — often indeed predominant — amount of the solvent must always be transported and stored. This advantage of course decreases as the concentration of the solutions increases. On the other hand, concentrated solutions are highly viscous and for this reason are difficult to handle. In contrast, polymers in solid form can be stored in simple paper bags or plastic sacks with the least possible weight and space requirement. For this reason, processes for preparing polymers in the form of solid particles are becoming of increasing interest.

Among these processes, pearl polymerization (suspension polymerization) is particularly common. In this process, a polymer insoluble in water is prepared from a suspension of monomers in water. However, it is very difficult to prepare pearl polymers of water-soluble monomers. To be sure, a number of processes are known according to which aqueous monomer solutions are suspended in hydrocarbons in the presence of suspending agents and are polymerized. The suspension of an aqueous polymer solution formed in this way can be dehydrated, for example by the addition of solvents removing the water, such as acetone. The dehydrated polymer can then be separated in the form of solid particles. The process can be carried out only with difficulty, or not at all, with many monomers, particularly with monomers which are not only soluble in water, but are also soluble in orgagnic solvents.

In those cases in which a suspension polymerization cannot be used, resort must be had to other polymerization processes. Liquid or meltable monomers can be polymerized in bulk and subsequently ground to form a granulate. However, in many cases, even the polymerization presents considerable difficulties, particularly because of the need to remove heat. Also, grinding is a laborious process.

Finally, it is also known to prepare polymers in the form of a solution which is subsequently dried to form a solid product. In this case too, either complicated polymerization apparatus must be employed which produces a polymer solution in a form which can readily be dried, or once again a solid product obtained by evaporating the polymer solution has to be ground. All of these disadvantages are so serious that in many cases the shipment and storage of polymers in the form of their solutions is considered the lesser evil.

It is also known to polymerize water-soluble monomers in a concentrated aqueous solution, whereby a solid, gel-like, solution is obtained. This gel can be cut up mechanically in the form of fine particles and dehydrated by azeotropic distillation in a hydrocarbon. However, the cutting up of the polymer gel is a difficult process on a technical scale and can be carried out only with apparatus especially developed for this purpose.

The present invention has as its object the preparation of polymers in the form of fine particles of uniform particle size without the need for any grinding or comminuting process. In particular, it is an object of the invention to develop such a process for those cases in which suspension polymerization processes cannot be carried out, or can only be carried out with difficulty, because of unsatisfactory solubility relationships.

The process of the invention starts with a solution of a polymer in a volatile polar solvent. According to the invention, the polymer solution is finely divided to form particles suspended in a non-polar organic suspending medium which is immiscible with the aforementioned polar solvent or has only a limited miscibility therewith, i.e. is "substantially immiscible", and which is not a solvent for the polymer. The polar solvent is subsequently removed by distillation, during which a suspending agent containing polar groups solvatable by the solvent and also containing non-polar groups which are solvatable by the organic medium is present at least part of the time.

The process of the invention offers the advantage that it can be carried out in conventional stirred vessels, that is without the need for grinding mills or comminuting apparatus. It produces polymers in the form of uniform, more or less spherical, particles of a size which can be adjusted between wide limits. It can also be employed in those cases in which both polar and non-polar monomers are present in the polymer structure. Particularly in this feature, the process of the invention is distinguished from a suspension polymerization proceeding in an organic phase, with which process the claimed process has a certain relationship since in both cases a suspension of a polymer solution is formed in an organic medium.

The polymers which can be prepared in the form of solid particles according to the process of the invention are predominantly of a polar nature. They can be water-soluble or can be copolymers comprising water-soluble monomers in part. In particular, the polymers of interest include those of vinyl and vinylidene compounds such as acrylamide or methacrylamide and their methylol compounds, vinyl pyrrolidone, hydroxy esters of acrylic acid or methacrylic acid, and acrylonitrile or methacrylonitrile.

Further, in particular, the polymers can be derived from salt-like monomers or from monomers which can be converted into salts. For example, $\alpha,\beta$-unsaturated monocarboxylic acids or dicarboxylic acids, such as acrylic acid, methacrylic acid, itaconic acid, maleic acid, or crotonic acid, as well as the water-soluble metal salts of these acids, particularly their alkali metal salts, and their salts with ammonia or organic amines, should be mentioned. Among the amines used for salt formation, tertiary aliphatic amines should be mentioned as preferred, such as trimethyl amine, triethyl amine, tributyl amine, and triethanol amine. However, primary and secondary amines such as ethanolamine or diethyl amine, and polyvalent amines such as ethylene diamine and triethylene diamine, and similar substances also can be used. Salt formation can take place before or after polymerization, the latter involving a solution of the polymeric carboxylic acid.

Monomers with basic groups, such as the aminoalkyl esters or aminoalkyl amides of the aforementioned unsaturated carboxylic acids, particularly of acrylic acid and methacrylic acid, can be incorporated into the structure of a polymer treated according to the present invention, either in their free form, in the form of their acid addition salts with mineral acids or organic acids, or in the form of quaternary ammonium salts.

Also, both acid and basic monomer units, for example methacrylic acid and dimethylaminoethyl methacrylate, may simultaneously be present in the same copolymer.

The polymers may be homopolymers of the aforementioned monomers, or copolymers formed between these monomers. However, they also may contain greater or lesser amounts of non-polar monomers, including vinyl and vinylidene compounds such as styrene, esters of acrylic acid or of methacrylic acid, vinyl esters, olefins, vinyl halides, and the like.

One requirement for the workability of the process of the invention is that the polymers be soluble in a volatile polar solvent. Water is used as the solvent to particular advantage: it is always suitable if the polymer is water-soluble. On the other hand, if the polymer is water-insoluble or has only limited water-solubility, i.e. is "substantially water-insoluble", it can often be dissolved in a mixture of water and of a volatile organic solvent miscible with water. Methanol, ethanol, acetone, and formic acid are particularly useful as such solvents. In those cases in which relatively weakly polar polymers are involved, these last-mentioned solvents or mixtures thereof with each other are better solvents for the polymers than are their mixtures with water. Also, polar solvents which are immiscible with water or have only limited miscibility, i.e. are "substantially immiscible", for example acetonitrile, can also be used alone or in combination. In case solvent mixtures are employed, attention must be paid to the fact that solubility properties may vary during distillation because of the different volatility of the components of the mixture: precipitation of the polymer should be avoided.

Since the process for the preparation of solid particles according to the present invention involves the removal of the solvent by distillation, the volatility of the solvent is an important characteristic. Suitable solvents are those which boil at normal pressure at temperatures up to about 200°C. or those which can be volatilized by azeotropic distillation with the organic suspending medium. If a small solvent content can be tolerated in the solid end product, limited amounts of a non-volatile or difficultly volatile solvent, i.e. a "substantially non-volatile" solvent, such as formamide, can be added to the solvent for improvement of the solubility of the polymer.

The polymer solutions used in the process of the present invention are as a rule prepared directly by polymerization of the corresponding monomers in the solvent. The polymerization takes place in a conventional fashion and is not a feature of the present invention. The solvents should have a viscosity such they can readily be finely divided by rapid stirring to form a suspension in an organic medium. Since this is possible even if the solution is extremely fluid, there is no lower limit on polymer content. Very high molecular weight polymers can be employed in solutions of less than 1 percent solids content, for example. The upper viscosity limit is determined by that point at which a subdivision into particles by a stirrer is no longer possible. If a conventional propeller stirrer is employed, this point is reached when a viscosity of 50000 centipoises is exceeded. At higher viscosities, special apparatus is required.

The organic medium in which the polymer solution is suspended is so chosen that two phases are formed when the medium is mixed with the polymer solution. Numerous non-polar organic liquids fulfill this condition if the polymer solution contains water as a solvent. Hydrocarbons, specifically lower, medium, and higher gasoline fractions; oils of different kinds; aromatic compounds, particularly hydrocarbons and chlorohydrocarbons such as benzene, toluene, xylene, diphenyl, chlorobenzene, and others; and hydrogenated aromatic compounds and cycloaliphatic hydrocarbons such as cyclohexane, tetralin, or decalin, are suitable in this case. Further, esters such as ethyl acetate, butyl acetate, and methyl propionate, are suitable, as are aliphatic chlorohydrocarbons, higher ketones and higher ethers such as heptanone-4 or dibutyl ether, as well as mixtures of the aforementioned liquids. This list of suitable organic media becomes smaller as the solvent contained in the polymer solution becomes more weakly polar.

Not only the possibility of miscibility of the two phases, but also the nature of the dissolved polymer, affects the choice of the organic suspending medium. As described above, weakly polar solvents are employed, if the polymer itself is weakly polar. Because of this, the polymer also has a greater tendency to dissolve in a non-polar organic suspending medium.

Among the aforementioned non-polar organic media, the higher ketones and ethers are relatively the most strongly polar, followed by the esters, chlorohydrocarbons, and aromatics. These liquids are, therefore, less suitable if acetonitrile, ethyl alcohol, ethanol, or methanol form a considerable portion of the polymer solution. In these cases, aliphatic hydrocarbons are used as the non-polar organic suspending medium. This latter class of materials, which includes straight-chain, branched chain, and cyclic isomers, is generally preferred as the organic medium.

The amount of the organic phase should be sufficient to permit ready sub-division of the polymer solution therein. Suitably, the volume of the organic suspending phase is at least as great as the amount of the polymer solution. However, the organic medium can be as much as two times or four times the volume of the polymer solution.

The presence of a suspending agent during the removal of the solvent is of considerable significance to the process of the invention. Just as in a suspension polymerization, the suspending agent serves to hinder an adhesion of the suspended particles to form larger aggregates. As long as the solvent has not yet been removed, a suspension of the polymer solution, which is still of relatively low viscosity, can be maintained simply by vigorous stirring. The problem of irreversible adhesion with the formation of larger aggregates is first encountered if the solvent has been partly removed and the droplets of the polymer solution have assumed a highly viscous sticky condition. Thus, a suspending agent need not be present when the suspension is formed. The addition of the suspending agent can be delayed so long as only particle agglomerates which are not larger than the particle size desired in the final product are formed by adhesion of single droplets. The addition of the suspending agent at this point hinders further agglomeration.

As soon as the solvent is removed to such a degree that the polymer particles do not adhere even when the suspension settles, the residual solvent can in principle be removed even in the absence of a suspending agent. However, since it is not possible to remove the suspending agent, and since it is also inexpedient to exchange the organic medium for one which does not contain any suspending agent, the solvent is generally completely removed in the presence of the suspending agent.

The nature of the suspending agent used depends to a large degree on the remaining components of the system. If an aqueous solution of a polymer is present in an aliphatic hydrocarbon as the continuous phase, then conventional water-in-oil emulsifying agents known in the art can be employed. Among these can be mentioned, for example, cellulose ether, hexadecyl sodium phthalate, cetyl-stearyl sodium phthalate, sorbitan monooleate, sorbitan monostearate, polyoxyethylene cetyl ether, polyoxyethylene stearyl ether, or polyoxyethylene oleyl ether, glycerin monooleate, glycerin monostearate, diesters of glycerin with palmitic acid and stearic acid or with palmitic acid and oleic acid, as well as calcium oleate and zinc oleate.

The efficacy of the so-called "water-in-oil emulsifiers" arises from their content of both a hydrophilic and a hydrophobic group. In this respect, they have a structure which is common to all surface-active agents. Among the surface-active agents, those materials having a large hydrophobic group are particularly useful as water-in-oil emulsifying agents. According to W. C. Griffen in Journal Soc. Cosmetic Chemistry 1, 311 (1950); op. cit. 5, 249 (1954); and Official Digest Federation Paint Varnish Prod. Clubs 28, 466 (1956) [cf. also the house publications "The HLB-System" of Th. Goldschmidt AG, Essen, Germany (1969) and "The Atlas-HLB-System" of Atlas Chem. Ind. (1963)], the "hydrophilic-lypophilic balance", generally designated as the "HLB", is critical to emulsifier activity. The HLB value can be determined by different calculations and experimental methods, and should have a value of from 3 to 8 in a good water-in-oil emulsifying agent. These principles can be useful in applying the present invention.

The aforementioned well-known dispersing agents, which also are employed for reverse suspension polymerization, are still not entirely satisfactory in many cases. The same is true also for hydrophobic inorganic solids, such as silanized silica, kaolin treated with dehydroabietyl amine, or bentonite treated with ammonium ions. Also, copolymers of nitrogen-containing basic monomers, such as of vinyl pyridines, amino alkyl esters or amino alkyl amides of acrylic or methacrylic acid, vinyl pyrrolidone, and of others, with long-chain esters of acrylic acid or methacrylic acid have already been proposed as "granulating agents", which term is also understood to include stabilizers for the peparation of resin suspensions in organic hydrocarbons. All of these materials are also usable in the process of the present invention if aqueous solutions of polymers such as polyacrylamide, which can be readily suspended, are dehydrated in benzene or some other aliphatic hydrocarbon.

Among the polymers which can be converted to solid particles according to the present invention, there are many for which the avoidance of clumping in their suspended solutions is quite difficult, particularly as more solvent is removed. In these cases, the solvent, the organic suspending medium, and the suspending agent must be carefully chosen to be compatible with one another. Since narrow limits are most often set on the choice of the first two components because of mutual solubility conditions, a suitable performance of the process is often decisively dependent on a correct choice of suspending agent.

Block copolymers and graft copolymers with polar and non-polar molecular portions can be made to fit the particular conditions of a given situation in such manifold ways that their use as suspending agents in the process of the invention is always satisfactory. Basically, they are so constituted that the individual blocks (considered alone), or the backbone polymer (considered alone) and the polymer forming the grafted branches (considered alone), are respectively soluble in the phase by which they are to be solvated. Taken together in the form of a block copolymer or graft copolymer, the combinations are, then, not clearly soluble in either phase. Nevertheless, they should be at least colloidally soluble or dispersible in the non-polar medium. If it is again postulated that water is the preferred solvent for the polymer, then block copolymers and graft copolymers having at least one hydrophilic (polar) and one hydrophobic (non-polar) molecular portion are the preferred suspending agents according to the process of the invention.

The hydrophilic molecular portion thereof can comprise salt-like monomers, for example the metal salts of unsaturated carboxylic acids, above all salts of acrylic acid or methacrylic but also including those of maleic, fumaric, itaconic, or erotonic acid. Preferred cations are those of the alkali metals. In addition, the salts of ammonia, and of primary, secondary, or tertiary amines, particularly those having lower aliphatic or optionally hydroxy-substituted radicals, come into consideration. Exemplary of amines of this type are ethanol amine, diethanol amine, triethanol amine, diethyl amine, dibutyl amine, trimethylamine, triethylamine, or tributylamine.

When basic polymers or polymers having quaternary ammonium groups are prepared according to the process of the invention, suspending agents also having this kind of group are preferred. Suitable monomers for the preparation of molecular portions of this type are vinyl pyridine, esters of acrylic acid or methacrylic acid having tertiary amino groups in the alcohol portion thereof, acid addition salts prepared from these materials by reaction with mineral acids or organic acids such as acetic acid, and esters of acrylic acid or methacrylic acid having a quaternary ammonium group in the alcohol portion.

Hydrophilic molecular blocks having free carboxyl groups or aminoalkylester- or aminoalkylamide-groups, i.e. groups which are not converted into the corresponding salt, are preferred to the salt-like groups of the solvent for the polymer contains little or no water. In these cases, units of vinyl pyrrolidone, of acrylamide or methacrylamide, or of vinyl imidazole can also be incorporated into the polar block. However, these last-mentioned monomers are also suitable as elements of polar blocks which are to be solvated by an aqueous polymer phase.

Polymer blocks of a weakened polar character can be prepared by the copolymerization of salt-like and non-salt-like monomers, or by the copolymerization of monomers which are convertible into salts by acids or bases with monomers which do not have these properties, or by the copolymerization of monomers which are only soluble in water with monomers which are additionally soluble in polar organic solvents. In this manner, the polar blocks can be made in all grades of possible polarity to match the polymer solution to be suspended.

The same breadth of variation exists for the preparation of a non-polar block for a suspending agent. For extremely non-polar organic suspending media, for example aliphatic hydrocarbons, hydrophobic blocks which predominantly comprise monomers having long-chain aliphatic groups are suitable. Such monomers include, for example, esters of acrylic acid and methacrylic acid, esters of maleic acid and similar unsaturated acids and higher alcohols having from 8–20 or more carbon atoms, vinyl esters of the higher fatty acids such as vinyl stearate, vinyl palmitate, and vinyl oleate, or vinyl esters of the so-called "versatic" acids, i.e. of branched higher carboxylic acids. With increasing polarity of the organic medium, monomers having a correspondingly shorter aliphatic residue can be employed in addition to or instead of monomers of the aforementioned type. If the organic medium comprises aromatics or hydrogenated aromatics, alkyl groups having from 4–10 carbon atoms in the side chains of the monomers are sufficient. However, longer chains are also still suitable. Still shorter aliphatic groups or aromatic groups, i.e. the $C_1$–$C_4$ alkyl acrylates, styrene, α-methyl styrene or vinyl toluene, vinyl acetate, vinyl propionate, vinyl butyrate, or vinyl butyl ketone for example, can be present in the non-polar blocks which are to be solvated by organic media of relatively strong polarity, such as chlorohydrocarbons, esters, ethers, and ketones.

Optimal conformity between the hydrophobic block and the non-polar organic suspending medium can be achieved in most cases when the non-polar block comprises different monomers differing in their polar character, particularly if the organic medium itself is a mixture of liquids of differing polarities.

Finally, the fact that the polar character of the polymer phase can change during the course of the process by removal of the solvent or by preferred distillative removal of one component of a mixture of different solvents should be taken into consideration. The dispersing agent should be optimally adapted to the polymer phase in its most adhesive condition, i.e. as a rule when the polymer content is from 40 to 80 percent in the suspended droplets of polymer solution.

As a rule, there is not just one, highly definite, composition for the polar and non-polar components of a suspending agent useful in a particular system comprising a polymer, solvent, and organic medium. Rather, by following the above-described principles, several suitable compositions producing the desired effect can be arrived at in most cases. A further possibility for variation is the incorporation, in the blocks, of limited amounts of monomers having neither a pronounced polar nor a pronounced non-polar character. Monomers of this type are, for example, the methyl and ethyl esters of acrylic acid and methacrylic acid, vinyl acetate, vinyl chloride, and acrylonitrile. These monomers can to a certain extent "dilute" the polar character evoked by pronouncedly polar or pronouncedly non-polar monomers, and in this manner weaken it.

The ratio by weight of the polar blocks to the non-polar blocks in the suspending agent is determined by the "HLB-valve". This value is defined exactly only for the case in which the polar block is in contact with an aqueous phase, in which case the value should lie between 3 and 8. HLB-values of this magnitude are obtained if the molecular weight of the non-polar block is many times in excess that of the polar block, preferably from 10–100 times. Also, in the case in which the polymer solution contains no water, a similar ratio by weight between the polar and non-polar blocks is maintained. The molecular weight of the polar block, or — in case the dispersing agent contains several polar blocks — the sum of their molecular weights, should preferably be in the region from 2,000 to 50,000. The molecular weight of the non-polar block is, as a rule, higher by a factor of 10 to 100, i.e., in the region from 20,000 to 5,000,000. Also in this case, if several non-polar blocks are present, this figure refers to the sum of their molecular weights. However, it is preferred that each molecule of the suspending agent contain only one non-polar block.

When the proportion between the polar and non-polar blocks is correctly adjusted, the suspending dispersing agent tends to accumulate in the phase boundary between the polymer solution and the organic medium. If the suspending agent is readily soluble in one of the phases, then its concentration in the phase boundary will decrease and its stabilizing effect is lessened. Therefore, the suspending agents are preferably insoluble in the polar phase; also they are not clearly soluble in the non-polar phase, but are soluble only with formation of micelles, recognizable by a more or less intense cloudiness. If the cloudiness remains for a long period of time, the blocks are in balance with each other. If the suspending agent settles, then the solvation of the molecular portion corresponding to the surrounding phase is too weak and should be increased either by increasing the molecular weight of the block or by accommodating its composition better to the polarity of the surrounding phase. On the other hand, if the dispersing agent is clearly soluble in the non-polar phase, then the molecular weight of the solvated block is reduced or that of the polar block is increased, or the amount of non-polar solvophilic groups in the molecular chain is decreased by "dilution" with weakly solvatable monomer units.

The polar and non-polar blocks of the dispersing agent can be bonded one to another according to the principle of graft copolymerization or according to the principles of block copolymerization. In the graft copolymers, the non-polar block preferably forms the backbone chain to which the polar blocks are joined as grafted branches. In the block copolymers, the polar blocks (P) and the non-polar blocks (N) are linearly joined one to another according to the scheme P—N, P—N—P, or N—P—N.

A number of particularly typical processes for the preparation of graft copolymers are described below.

1. Free radical sites are produced on a backbone polymer by irradiation or by the influence of free radicals formed from polymerization initiators, from which sites grafted branches are formed in the presence of a grafting monomer. In addition to the graft copolymer, a non-grafted polymer or copolymer of the grafting monomer or monomers is produced, usually in a predominant amount. This material has no dispersing effect and, if the polymer is employed as a stabilizer, dissolves in that phase for qhich it has the greater solvophilicity. Because of this undesirable side effect, the use of stabilizers formed by statistical grafting is not a preferred embodiment.

2. A considerably higher proportion of grafted copolymer is obtained if the grafting monomer is polymerized in the presence of a backbone polymer which contains unsaturated side groups. The preparation of such polymers is kbown in the art and in most cases proceeds by reaction of a polymer containing reactive groups with a compound which has a complementary reactive group and a double bond polymerizable by free radical polymerization, which is a subsequent grafting site. Suitable complementary reactive groups include, for example, anhydride, carboxylic acid chloride, carboxy, epoxy, isocyanato, or azolactone groups on the one hand, and hydroxy, amino, or hydrazino groups on the other hand. For example, graft copolymers can be formed between backbone polymers comprising maleic acid anhydride, itaconic acid anhydride, acrylic or methacrylic acid chloride, glycidyl acrylate or glycidyl methacrylate, vinyl isocyanate, or 2-isopropenyl-4,4-dimethyl-oxazolone-5, and grafting monomers of allyl alcohol, hydroxyalkyl esters of acrylic or methacrylic acid, acrylic acid ethanolamide or methacrylic acid ethanolamide, methylol acrylamide, methylol methacrylamide, aminoalkyl esters of acrylic acid or methacrylic acid, acrylic acid hydrazide, or methacrylic acid hydrazide. The aforementioned reactions are for the most part also possible, under sufficiently energetic reaction conditions, if the polymer contains units of acrylic, methacrylic, maleic, fumaric, or itaconic acid. The reverse case, in which the aforementioned monomers are first built into a polymer and are then reacted with free monomers like those contained in the aforementioned polymers is also possible for the preparation of polymers with unsaturated side groups. Finally, polymers of this type can be prepared in a single step if monomers with two unsaturated double bonds of different reactivity are subjected to copolymerization under conditions such that predominantly only one of the double bonds is involved in polymerization. The remaining double bond is a subsequent grafting site. Suitable monomers of this type include, for example, allyl acrylate and allyl methacrylate.

By a free radical polymerization of grafting monomers in the presence of a polymer having unsaturated side groups, a graft copolymer-like product is obtained. The degree of polymerization of the grafting branches is so adjusted, optionally by the addition of transfer agents, that it approximately corresponds to the quotient formed between the number of equivalents of unsaturated monomer and the number of equivalents of unsaturated side groups in the backbone polymer. At higher degrees of polymerization, cross-linking takes place. Lower degrees of polymerization lead to formation of a polymer of the grafting monomer which is not attached to the backbone polymer.

3. The condensation or addition reactions described above under (2) can be used in such a way that entire molecular portions of different solvophilicity are joined with one another. In this process, two polymers of differing solvophilicity are independently prepared to contain reactive groups which are complementary, and the polymers are then reacted. At least one of the polymers should not have more than one reactive group per macromolecule on the average in order to avoid cross-linking.

4. The graft copolymers are prepared to particular advantage from a backbone polymer which contains side-substituted azo groups or peroxy groups, the free radical decomposition of which initates the formation of grafting branches in the presence of a graft monomer. Two cases must be distinguished, namely:
  A. the azo groups or peroxy groups are unilaterally bound to the macromolecule; or
  B. the azo groups or peroxy groups are bound on two sides with a macromolecular chain.

These are illustrated in sketches (A) and (B) below, in which "Initiator" is used to designate a group containing an azo group or peroxy group, possibly together with further atomic groups, attached to one or two macromolecular chains, (A) 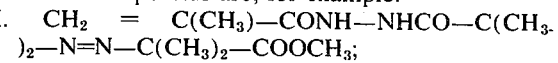

(B) 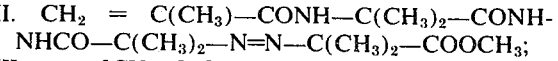

In case (B), the decomposition of an initiator group produces two free radical sites (Rad), each bound to a macromolecule. These sites are the starting point for a grafting branch. In contrast in case (A), a free radical (Rad') from which no grafted polymer chain is formed is produced in addition to the radical (Rad) which is bound to a macromolecule. If the nongrafting material produced in (A) is objectionable, a backbone polymer of type (B) is used.

The initiator-containing backbone polymer must be prepared under conditions in which the azo groups or peroxy groups do not decompose. If it is prepared by free radical copolymerization from an unsaturated free radical-polymerizable monomer having an azo group or peroxy group, a free-radical initiator having a considerably lower decomposition temperature than has the azo or peroxy group should be employed for this reaction. Suitable polymerizable initiators, as well as the conditions under which they can be polymerized without decomposition, are described in German patent No. 1,055,240, for example. Polymerizable derivatives of azobisisobutyric acid-monoamide, -diamide, -monohydrazide or -dihydrazide are employed to particular advantage since they have decomposition temperatures above 100°C. and can be copolymerized below this temperature with conventional polymerization initiators. Such compounds are, for example:

I. $CH_2 = C(CH_3)—CONH—NHCO—C(CH_3)_2—N=N—C(CH_3)_2—COOCH_3$;

II. $CH_2 = C(CH_3)—CONH—C(CH_3)_2—CONH—NHCO—C(CH_3)_2—N=N—C(CH_3)_2—COOCH_3$;

III. $[CH_2=C(CH_3)—CONH—NHCO—C(CH_3)_2—N=]_2$; and

IV. $[CH_2=C(CH_3)—CONH—C(CH_3)_2—CONH—NHCO—C(CH_3)—N=]_2$. In these compounds the portion of the molecule containing the carbon-carbon double bond is derived from methacrylic acid chloride in case of compounds (I) and (III) and from 2-isopropenyl-4,4-dimethyloxazolone-5 in the case of compounds (II) and (IV). The portion of the molecule containing the azo group is derived from azobis isobutyric acid monohydrazide-monomethylester in the case of compounds (I) and (II), and from azobis isobutyric acid dihydrazide in the case of compounds (III) and (IV).

A backbone polymer containing units of monomers of the formulas (I)–(IV) is obtained also by reacting copolymers of acrylic acid chloride or methacrylic acid chloride, or of 2-isopropenyl-4,4-dimethyl-oxazolone-5, with one of the aforementioned azobis isobutyric acid hydrazides. This polymerization principle can, naturally, also be embodied with other compounds comprising azo groups or peroxy groups, or with compounds comprising different kinds of reactive groups in the backbone polymer, for example methacrylic acid anhydride groups or maleic acid anhydride groups.

Block copolymers suitable for use as dispersing agents can be obtained, for example, according to the following processes.

1. Heavy forces are exerted on a polymer (mastication) in the presence of a monomer of different solvophilicity. Free radical sites are formed by chain breakage, on which sites polymer blocks of the added monomer are formed.

2. Two polymers of different solvophilicity are masticated in admixture. Block polymers are formed by chain break of a polymer molecule, with formation of a free radical, and recombination with chain fragments of the other polymer.

3. Two polymers of different solvophilicity having complementarily reactive end groups are reacted with one another to form a block copolymer. For example, one of the polymers can be prepared in the presence of mercaptoacetic acid as a chain transfer agent or in the presence of 4,4'-azo-bis-4-cyanopentanoic acid as an initiator, and the other can be prepared in the presence of mercapto ethanol. On heating, preferably in the presence of an acid catalyst, the carboxy groups of one of the polymers react with the hydroxyl groups of the other polymer to form ester groups.

4. A water-insoluble monomer is suspended in the form of droplets in an aqueous solution of a monomer which contains an initiator which is soluble only in water, such as potassium persulfate, for example. By polymerization of the water-soluble monomer in the aqueous phase, the growing polymer chain end can penetrate the phase boundary into the droplet of the suspended monomer and grow in the droplet with formation of a block from the suspended monomer. Homopolymers of the two monomer types are always formed as by-products. These by-products generally do not affect the emulsifying action of the block polymer. Nevertheless, they are easily separated by selective extraction if desired.

The process of the present invention is, as a rule, carried out discontinuously in a way such that the organic suspending medium, which may already contain the suspending agent, is present in a vessel equipped with a stirrer and the polymer solution is gradually added with vigorous stirring. The size of the droplets of polymer solution which are formed depends on the form of the stirrer and the velocity of stirring and is — at least in the later course of the process — also influenced by the kind and amount of the suspending agent. The average droplet size is greater, the greater the viscosity of the polymer solution at the time the dispersing agent is added, the smaller the amount of suspending agent, and the smaller the velocity of the stirring. These relationships are also known from suspension polymerization processes. In this way, the average droplet size can be varied between about 0.1 mm and about 10 mm. When the particle size is greater than about 5 mm, spherical particles can generally no longer be obtained. In this case, depending on the conditions of stirring, either lenticular, oblate spheroidal, or more or less irregularly-formed particles are obtained.

The removal of the solvent is by distillation in a manner which may differ somewhat from case to case. One can operate at atmospheric pressure, or at sub- or super-atmospheric pressures. If water is the solvent, it can be removed by azeotropic distillation with aliphatic or aromatic hydrocarbons, chlorohydrocarbons, and numerous other materials. Suitably, the organic medium is returned to the distillation vessel after separation of the water in a phase separator. If a high boiling liquid is chosen as the organic suspending medium, the solvent can be removed alone by distillation.

When mixtures are employed as the solvent, one component can distill off more rapidly than the other. Because of the resultant impoverishment of the polymer solution in the more highly volatile component, it is possible that the polymer may precipitate. This is avoided by combining solvents which have closely similar boiling points, by combining solvents in a ratio corresponding with a mixture distilling as an azeotrope, or by continuously replenishing the more volatile solvent.

The distillation can be interrupted as soon as the particles no longer adhere to each other, even on settling. However, distillation is suitably continued until the solvent is completely removed. Residual solvent can also be recovered by subsequent drying of the separated particles, optionally under reduced pressure. However, a residual solvent content of 5–10 percent is in most cases not disadvantageous to subsequent use of the polymer.

For separation of the polymer particles freed of solvent, filter arrangements, centrifuges, and the like, can be employed in procedures well known in the art. Any residue of high-boiling organic medium can be removed by washing with lighter organic liquids, such as lower gasoline fractions.

It is also possible to carry out the process of the invention continuously by permitting the suspension to flow through a cascade of stirred vessels or through a column having several stages, in each of which there is a stirring apparatus.

The resultant polymers, which are in the form of pearls, can be used per se for forming or for injection molding, or can be used in dissolved form for the preparation of coating and impregnating agents, adhesives, dressing agents for yarns, binders, and the like. Blowing agents which are stable under the process conditions and which are not volatile can be added to the solutions and foamable polymer pearls, also, can be obtained in this manner. Thus, for example, pearls which can be worked into polyacrylimide foams or polymethacrylimide foams are obtained if urea, dimethylurea, formamide, or monomethylformamide are added as blowing agents to a solution comprising a polymer or copolymer predominantly formed from acrylic acid or methacrylic acid, or from mixtures thereof with their amides or nitriles. In this case, a mixture of water and methanol is suitable as the solvent.

A better understanding of the present invention and of its many advantages will be had by referring to the following specific examples, given by way of illustration. In the following examples, all parts are parts by weight.

I. PREPARATION OF SUSPENSION STABILIZERS

Suspension Stabilizer A 25 parts of butyl methacrylate are suspended with vigorous stirring in a solution comprising 75 parts of water and 25 parts of trimethyl-$\beta$-methacryloxyethyl-ammonium chloride, 2 parts of a copolymer formed from equal parts of dimethylaminoethyl methacrylate and butyl methacrylate, and 0.2 part of 4,4'-azo-bis-4-cyanopentanoic acid. The mixture is heated for 3 hours at 70°C. under an atmosphere of carbon dioxide and then is heated at 75°C. for one more hour after the addition of a further 0.14 part of the initiator. A viscous white dispersion with a 40 percent polymer solids content is produced. For the polymer obtained, $\eta_{sp}/c = 0.6$, measured at 20°C. in a 1 percent solution in a mixture of ethylene glycol and dioxane (96.5:3.5).

Suspension Stabilizer B 45 parts of butyl methacrylate are suspended with vigorous stirring in a solution of 5 parts of sodium acrylate, 2 parts of a copolymer comprising 70 parts of sodium methacrylate and 30 parts of styrene, and 0.2 part of 4,4'-azo-bis-4-cyanopentanoic acid in 75 parts of water. The mixture is warmed for 3 hours at 70°C. under a $CO_2$ atmosphere and heated for one more hour at 75°C. after the addition of a further 0.14 part of initiator. A white dispersion having a polymer solids content of 40 percent and having a Brookfield viscosity of 300 centipoises (20°C., Spindle I, 6 rpm) is obtained.

Suspension Stabilizer C 29.1 parts of butyl methacrylate, 0.9 part of azobis-N-(methacrylamidoisobutyrol)-isobutyric acid hydrazide (prepared from 2 mols of 2-isopropenyl-4,4-dimethyloxazolone-5 and one mol of azobis-isobutyric acid hydrazide), and 0.3 part of azobis-isobutyric acid ethyl ester are dissolved in 70 parts of ethylene glycol and heated at 80°C. for four hours under a $CO_2$-atmosphere. Then, a solution of 20 parts of trimethyl-$\beta$-methacryloxyethyl ammonium chloride in 47 parts of ethylene glycol is added and the mixture is heated at 115°C. for 4 hours. A cloudy white solution with a 30 percent solids content and Brookfield viscosity of 1500 centipoises is obtained.

Suspension Stabilizer D

The process described above under (C) is repeated with the difference that a mixture of butyl methacrylate and $\beta$-hydroxypropyl acrylate (weight ratio 23.1:6) is used instead of butyl methacrylate alone. The solution obtained has a Brookfield viscosity of 1750 centipoises.

Suspension Stabilizer E

The process of (C) is repeated with the difference that a solution of 12.9 parts of acrylamide in 30 parts of ethylene glycol are used instead of the solution of trimethyl-$\beta$-methacryloxyethyl-ammonium chloride. A 30 percent polymer solution having a viscosity of 1500 centipoises is obtained.

Suspension Stabilizer F

The process described under (C) above is repeated with the difference that, in place of trimethyl-$\beta$-methacryloxyethylammonium chloride, the same amount of methacrylic acid is employed. The 30 percent polymer solution obtained has a Brookfield viscosity of 12000 centipoises.

Suspension Stabilizer G 36 parts of decyl methacrylate, 4 parts of isopropenyl-1-4,4-dimethyl-oxazolone-5, and 0.5 part of t-butyl peroctoate are dissolved in 60 parts of white spirits and the solution is warmed at 80°C. for 4 hours under a $CO_2$-atmosphere. The polymer solution obtained is combined with a solution of 84 parts of ethyl acrylate, 9.5 parts of 2-hydroxypropyl acrylate, and 2 parts of azobis-isobutyric acid hydrazide in a solvent mixture of 120 parts of solvent naphtha and 20 parts of glacial acetic acid. On heating the reaction mixture, addition of the azobis-isobutyric acid hydrazide to the 4,4-dimethyl-oxazolone-5-group of the polymer formed in the first step is initiated. On heating for 4 hours at 115°C., a cloudy white solution with a 39 percent solids content and a Brookfield viscosity of 190 centipoises is obtained. For the graft copolymer, $\eta_{sp}/c = 0.05$ at 20°C. in chloroform.

II. PREPARATION OF SOLID PRODUCTS FROM POLYMER SOLUTIONS

EXAMPLE 1

100 parts of a 40 percent aqueous polyacrylic acid solution (Brookfield viscosity = 1500 centipoises) is suspended in 200 parts of a mixture of tetrachloroethylene/n-heptane (60/40) with the aid of 0.2 part of suspension stabilizer B while stirring with a propeller stirrer (500 rpm). Subsequently, the water is removed at 79.2°C. by azeotropic distillation using a water separator. Hard, glassy pearls having a diameter of 0.3 mm are obtained. These are filtered off with suction and dried at 60°C. in a drying oven.

EXAMPLE 2

The process of Example 1 was repeated. Instead of the 40 percent aqueous acrylic acid solution, a 40 percent aqueous solution of a copolymer comprising 50 parts of acrylic acid and 50 parts of methacrylic acid is used (Brookfield viscosity = 7000 centipoises). 0.5 part of stabilizer F is used instead of stabilizer B. Glassy pearls having a diameter of 0.7 millimeters are obtained.

EXAMPLE 3

The process of Example 1 is repeated using a 40 percent aqueous solution of a copolymer of 60 parts of trimethyl-$\beta$-methacryloxyethyl-ammonium chloride and 40 parts of methyl methacrylate (Brookfield viscosity = 4000 centipoises) and 0.3 part of suspension stabilizer A. Glassy pearls having an average diameter of 0.5 mm are obtained.

EXAMPLE 4

Example 3 is repeated using 0.8 part of suspension stabilizer C instead of suspension stabilizer A. Pearls having a diameter of 0.3 mm are obtained.

EXAMPLE 5

The process of Example 1 is repeated using a 25 percent aqueous solution of a copolymer comprising 70 parts of acrylonitrile and 30 parts of methyl methacrylate, hydrolyzed to 70 mol percent with sodium hydroxide (Brookfield viscosity = 10000 centipoises), and 0.5 part of suspension stabilizer B. Glassy, lenticular particles having a particle size of about 0.8 mm are obtained.

EXAMPLE 6

The process according to Example 1 is repeated using a 50 percent solution of a copolymer of 60 parts of methyl methacrylate, 16 parts of butyl acrylate, and 24 parts of sodium acrylate in a mixture of water/isopropanol (82.5/17.5) (Brookfield viscosity = 5000 centipoises), and 0.1 part of suspension stabilizer B. Non-tacky pearls having a diameter of 0.4 mm are obtained.

What is claimed is:

1. A method for preparing a water-soluble polymer in solid particulate form, which method comprises finely distributing droplets, of an average droplet size between 0.1 mm and 10 mm, of an aqueous solution of said polymer in a non-polar organic suspending medium which is not a solvent for said polymer, said aqueous solution of polymer comprising as the solvent therein water or a mixture of water and a polar organic solvent, said aqueous solution and said non-polar organic suspending medium being substantially immiscible whereby a liquid/liquid dispersion is formed, and then removing water from the dispersion by azeotropic distillation, at least a portion of said water being distillatively removed in the presence of an organic water-in-oil suspending agent having a polar portion solvated by said aqueous solution and a non-polar portion solvated by said non-polar suspending medium.

2. A method as in claim 1 wherein at least one of said polar portion and said non-polar portion of said suspending agent is macromolecular.

3. A method as in claim 1 wherein said suspending agent is a member selected from the group consisting of graft copolymers having a backbone polymer portion which is the polar portion or the non-polar portion thereof, and a grafted polymer portion which is the non-polar portion or the polar portion thereof respectively; and block copolymers comprising at least one first block portion which is the polar portion thereof and at least one second block portion which is the non-polar portion thereof.

4. A method as in claim 3 wherein the molecular weight of the non-polar portion of said suspending agent is from 10 to 100 times that of the polar portion.

5. A method as in claim 3 wherein the molecular weight of the non-polar portion of said suspending agent is from 20,000 to 5,000,000 and the molecular weight of said polar portion is from 2000 to 50,000.

6. A method as in claim 3 wherein said suspending agent is a block copolymer.

7. A method as in claim 3 wherein said suspending agent is a graft copolymer.

8. A method as in claim 7 wherein the backbone portion is the non-polar portion of said graft copolymeric suspending agent.

9. A method as in claim 1 wherein said organic suspending medium comprises an aliphatic hydrocarbon.

10. A method as in claim 1 wherein said polymer predominantly comprises at least one member selected from the group consisting of acrylic acid, methacrylic acid, and metal, ammonium, and amino salts of these acids; acrylamide; methacrylamide; and amino alkyl acrylates, amino alkyl methacrylates, and acid addition salts and quaternary ammonium salts thereof.

* * * * *